United States Patent [19]

Tellerman

[11] Patent Number: 4,939,457

[45] Date of Patent: Jul. 3, 1990

[54] FLEXIBLE TUBE SONIC WAVEGUIDE FOR DETERMINING LIQUID LEVEL

[75] Inventor: Jacob Tellerman, Bayside, N.Y.

[73] Assignee: MTS Systems Corporation, Minneapolis, Minn.

[21] Appl. No.: 346,654

[22] Filed: May 3, 1989

[51] Int. Cl.$^5$ .................. G01B 7/26; G01F 23/30; H04B 11/00; H03H 9/22

[52] U.S. Cl. .................. 324/207.13; 73/314; 333/148; 324/207.24

[58] Field of Search .................. 324/204, 207–209; 73/313, 314; 333/148

[56] References Cited

U.S. PATENT DOCUMENTS

| | | | |
|---|---|---|---|
| 3,898,555 | 8/1975 | Tellerman | 324/34 |
| 4,000,651 | 1/1977 | Christiansen | 73/314 |
| 4,726,226 | 2/1988 | Tellerman | 73/292 |
| 4,803,427 | 2/1989 | Mason et al. | 324/207 |

Primary Examiner—Gerard R. Strecker
Attorney, Agent, or Firm—Kinney & Lange

[57] ABSTRACT

A sonic delay line assembly suitable for shipping in coiled form allowing for expedited installation, particularly in liquid storage tanks. The sonic delay line comprises a sonic waveguide made of solid wire, which also serves as an electrical pulse conductor for the generation of sonic pulses on waveguide through interaction with a positionable static magnetic field. A sonic waveguide containment can be provided to protect the flexible tubing and sonic waveguide. Positioned around the containment and free to ride up and down the containment as liquid levels in the tank vary is a float. The float carries an annular magnet with poles axially aligned with sonic waveguide to provide the magnetic field with which the magnetic fields of the electrical pulses on the sonic waveguide interact.

17 Claims, 3 Drawing Sheets

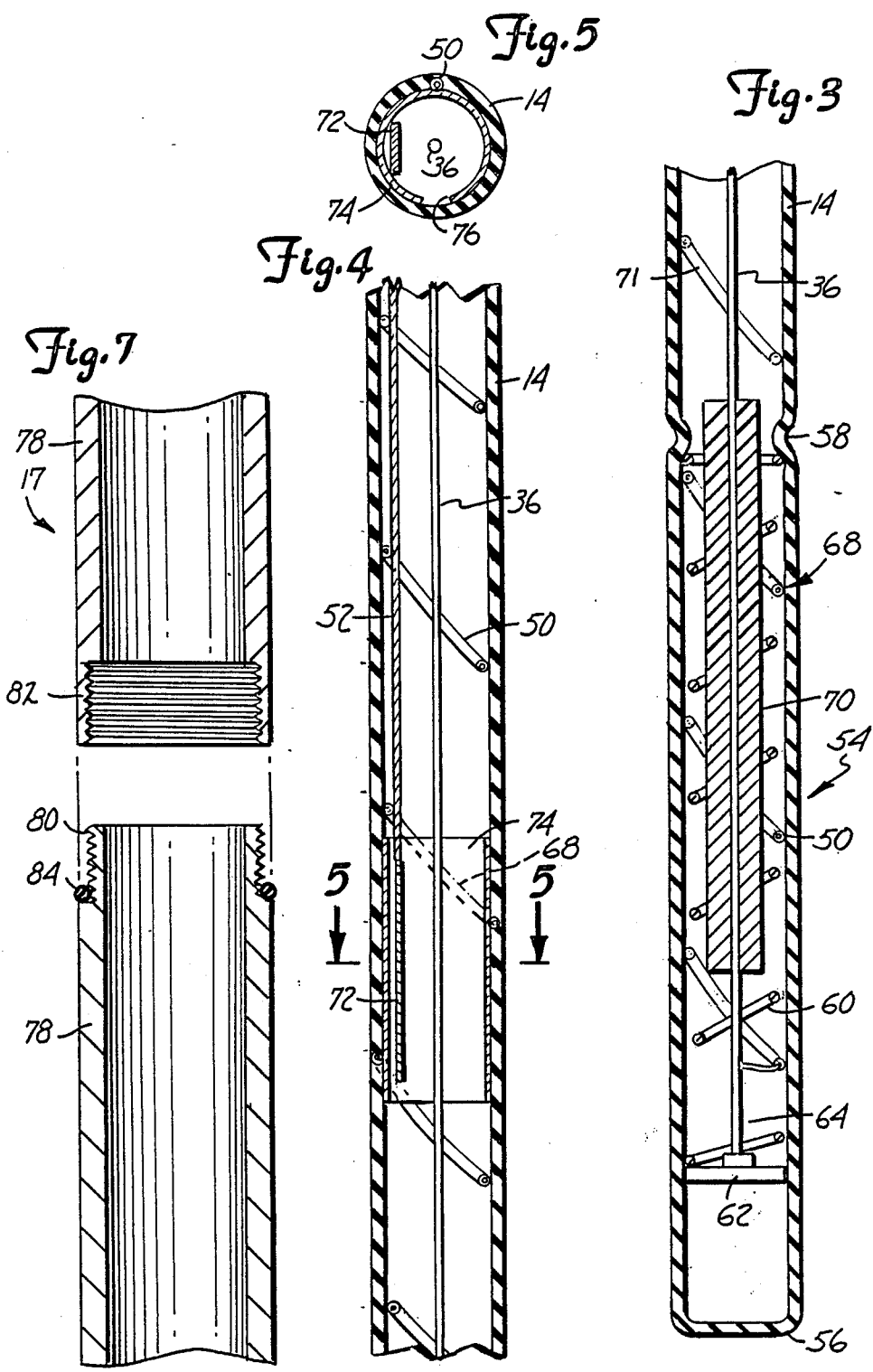

FLEXIBLE TUBE SONIC WAVEGUIDE FOR DETERMINING LIQUID LEVEL

Incorporation herein by reference is hereby made of U.S. Pat. No. 3,898,555 to Jacob Tellerman, entitled Linear Distance Measuring Device Using a Movable Magnet Interacting with a Sonic Waveguide, issued on Aug. 5, 1975.

Incorporation herein by reference is also made of U.S. Pat. No. 4,726,226 to Jacob Tellerman, entitled Distance and Temperature Measuring System for Remote Locations, issued Feb. 23, 1988.

BACKGROUND OF THE INVENTION

The invention relates to sonic waveguide delay lines, particularly sonic waveguide delay lines used for displacement measurement.

It is well known that torsional twisting may be induced on a current carrying ferromagnetic rod through interaction of a magnetic field generated by a current in the rod and a second magnetic field. The second magnetic field may be supplied by an annular magnetic or a set of discrete magnets positioned around or near the rod. Discrete magnets are preferably positioned so that their poles are perpendicular to the rod. If an annular magnet is used, it is disposed around the rod. By fixing ends of the rod and drawing the rod taut, the rod will also support the transmission of sound. Thus a rod can also act as a sonic waveguide.

Sound waves are induced in sonic wave guides by transmitting short duration electrical current pulses on the sonic waveguide. Torsional twisting is imposed on the conductor in the area where the magnetic fields produced by the current pulses interact with the magnetic field of the permanent magnets. The torsional twists propagate outwardly along the waveguide from the area of interaction as sonic pulses.

A transducer is attached to the sonic waveguide at a reference point along the rod to reconvert the sonic pulses to electrical signals. The time delay between transmission of an electrical current pulse and reception of the resulting sonic pulse is related to the displacement of the second magnetic field from the reference point. By knowing the propagation velocity of sound in the waveguide, the displacement of the second waveguide magnetic field from the transducer may be calculated.

Typical prior art sonic waveguides included a thin electrically conductive wire centered within a thin walled ferromagnetic tube. In such waveguides, the electrical pulse is transmitted down the centered wire and torsional sonic pulses are transmitted along the tube. Transducer apparatus is located at the waveguide reference point, formed from a pair of flat tapes fixed on diametrically opposite sides of the tube. A torsional sonic pulse on the sonic waveguide becomes longitudinal pulses in the tapes. Longitudinal pulse trains in the opposed tapes result in a change in the magnetization or permeability of the tapes. In the presence of a magnetic bias field a change in the magnetic field through coils wound on the tape results. This produces an induced voltage across the coils. The coils are interconnected to provide a summed signal of suitable amplitude to indicate the arrival of the sonic torsional pulse. (A permanent magnet provides the magnetic bias for the coils.)

Sonic delay lines comprising hollow tube waveguides have been used for the determination of the volume of a liquid in a tank of fixed size. The waveguides are positioned vertically in the tank, generally extending from near the bottom of the tank to above the maximum permitted depth of the stored liquid. A float is provided which rides at the top of the liquid in the tank and around or alongside of the hollow tube sonic waveguide. The float carries an annular magnet or a plurality of discrete magnets, which provide a static magnetic field with which magnetic fields generated along the internal conductor interact. As liquid depth varies, the float moves along the sonic waveguide, changing the position of the magnet with respect to the waveguide. An electrical pulse sent down a wire centered in the waveguide, having a magnetic field associated therewith, will, upon reaching the magnet, interact with the magnetic field of the magnet to generate a sonic pulse on the waveguide at about the level of liquid in the tank. The sonic pulse will be conveyed back to operating circuitry associated with the waveguide at a reference position on the waveguide, typically at or near the top of the tank.

Fuel tank depths can exceed 80 feet. This requires a sonic waveguide of at least this length to provide depth measurement. The use of rigid hollow tubes is difficult. On the one hand, the handling of rigid tubes of such length during installation of the waveguide is clumsy. Assembly of some prior art waveguides has required in situ stringing of the centered conductor wire in the tube and of its return wire back through the supports. This procedure has proven difficult and time consuming.

SUMMARY OF THE INVENTION

The invention provides an electrically excited sonic delay line assembly suitable for shipping in coiled form and allowing for expedited installation. The sonic delay line comprises a sonic waveguide made of a solid, ferromagnetic, electrically conductive wire. The wire also serves as the delay line conductor, with electrical excitation for the generation of sonic pulses being applied directly to the wire waveguide.

The waveguide is positioned within a flexible tube, which in turn protects the waveguide. The flexible tube can be longitudinally bent allowing the tube to be coiled, but resists radial compression and expansion. The return wire for electrical pulses applied to the waveguide is wound into a cylindrical helix of a diameter slightly larger than that of the inside of the flexible tube. The return wire is typically made of copper clad steel which provides a spring effect in the helix. The helically wound wire is drawn into the flexible tube where it expands to seat itself against the interior of the tube. A rubber buffer tube of soft durometer and larger in diameter than the return wire is disposed around the return wire and wound with the wire into a helix. The buffer tube engages the interior wall of the flexible tube under pressure applied by the return wire. The buffer tube also provides a bumper to the interior of the return wire helix for preventing the sonic waveguide from colliding with the return wire or the interior of flexible tube. Prevention of such collisions helps prevent generation of shock waves in the waveguide. Such shock waves can act as interference complicating reading of the torsional pulses used for distance measurement.

An anchor assembly disposed at a first end of the flexible tube includes an end damping structure for dissipating sonic vibrations on the waveguide and a compression spring for applying tension to the waveguide. The damping structure is located centered within the compression spring to permit the waveguide to extend close to the end of the tube, and by virtue of the tube's orientation when installed in a tank, close to the bottom of the tank. The second end of the flexible tube is sealed, and located at the top of a tank when sonic delay line is installed for use. Co-located with the second end are an electrical pulse driver, a sonic pulse transducer, a signal amplifier and optional temperature sensing circuitry.

A sonic waveguide containment can be provided to hold the flexible tubing and sonic waveguide. The containment comprises a plurality of cooperating tube segments which can be assembled to provide the containment. The tube segments are manufactured in convenient lengths for shipping and handling.

Positioned around or adjacent the containment and free to ride up and down the containment as liquid levels in the tank vary is a float. The float carries an annular magnet or a series of discrete magnets with poles oriented to provide a magnetic field perpendicular with respect to the sonic waveguide. The magnets provide the static magnetic field with which the magnetic fields generated by electrical pulses applied to the waveguide interact to generate torsional twisting of the sonic waveguide. Displacement of the magnet through displacement of the float indicates changing levels of liquid in the tank.

Where temperature readings are required to normalize liquid volume with respect to a given temperature, a temperature responsive sensor such as a thermistor is fixed into position against the inner wall of the flexible tube. Leads to the sensor can be held in place by spring action of the return wire by positioning the helically wound return wire after insertion of the transducer.

BRIEF DESCRIPTION OF THE DRAWINGS

FIG. 3 is a cross sectional view of a terminating end for the sonic waveguide.

FIG. 4 is a cross sectional view of a portion of the sonic waveguide at the point of installation of a thermistor.

FIG. 5 is a section view along section line 5—5 in FIG. 4.

FIG. 7 is a partial cross sectional view of adjacent end portions of sonic waveguide containment portions.

DETAILED DESCRIPTION OF THE PREFERRED EMBODIMENT

Figure 1:
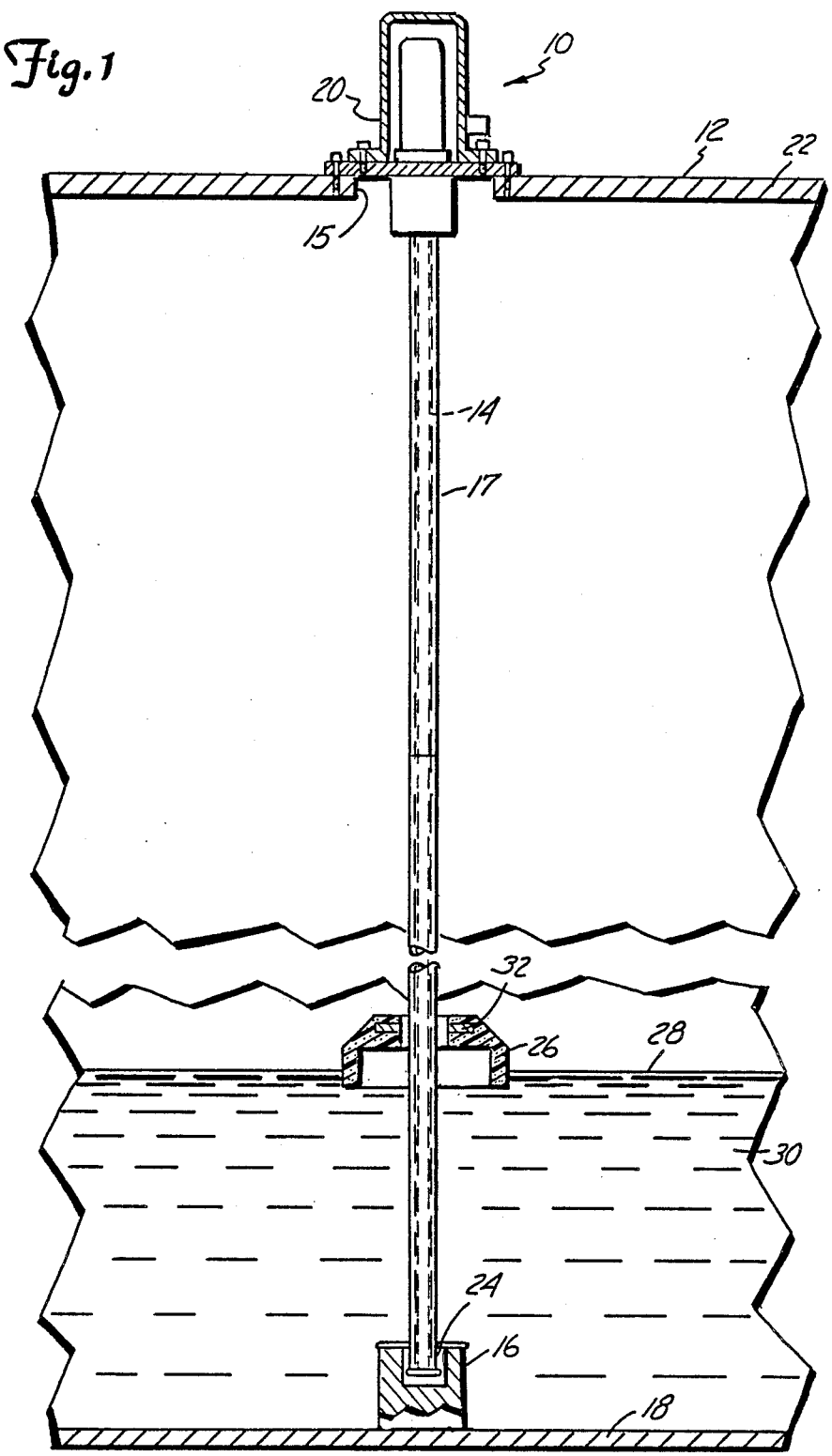
FIG. 1 is a partial cross sectional view of a sonic waveguide liquid level determining apparatus vertically positioned in a liquid storage tank.

FIG. 1 illustrates an embodiment of an electrically excited sonic delay line assembly 10 positioned for measuring liquid depths in a liquid storage tank 12. A sonic waveguide is positioned within a flexible tube 14 (shown in shadow), which is introduced to storage tank 12 through an aperture 15 through top 22 of tank 12. Flexible tube 14 is disposed within containment 17 which is fixed in position in tank 12 between an anchor 16 resting on bottom 18 of the tank and a headend 20 bolted through top 22 of the tank over aperture 15.

Located within headend 20 are an electrical pulse driver, a sonic pulse transducer, a signal amplifier and optional temperature sensing circuitry for use with the sonic wave guide. The circuitry is conventional and is collectively illustrated as headend circuitry 42 (See FIG. 2). Terminating end 24 of containment 17 is sealed and fixed to anchor 16 to prevent movement of assembly 10. A float 26 rides at the surface level of liquid 30, positioned around containment 17. Float 26 may be of a specific gravity selected so that the float rides at the interface between two liquids.

A magnet or magnets 32 are positioned in float 26, generating a magnetic field transverse to a waveguide housed in containment 17 in the area approximately adjacent to the float. Magnets 32 have like poles facing one another perpendicular to the sonic waveguide, which is coaxial with and inside containment 17. The magnet provides the static magnetic field with which the magnetic fields generated by electrical pulses applied to the waveguide interact to generate torsional twisting of the sonic waveguide. Displacement of magnet 32 through displacement of float 26 indicates changing surface levels 28 of liquid 30 in tank 12.

Figure 2:
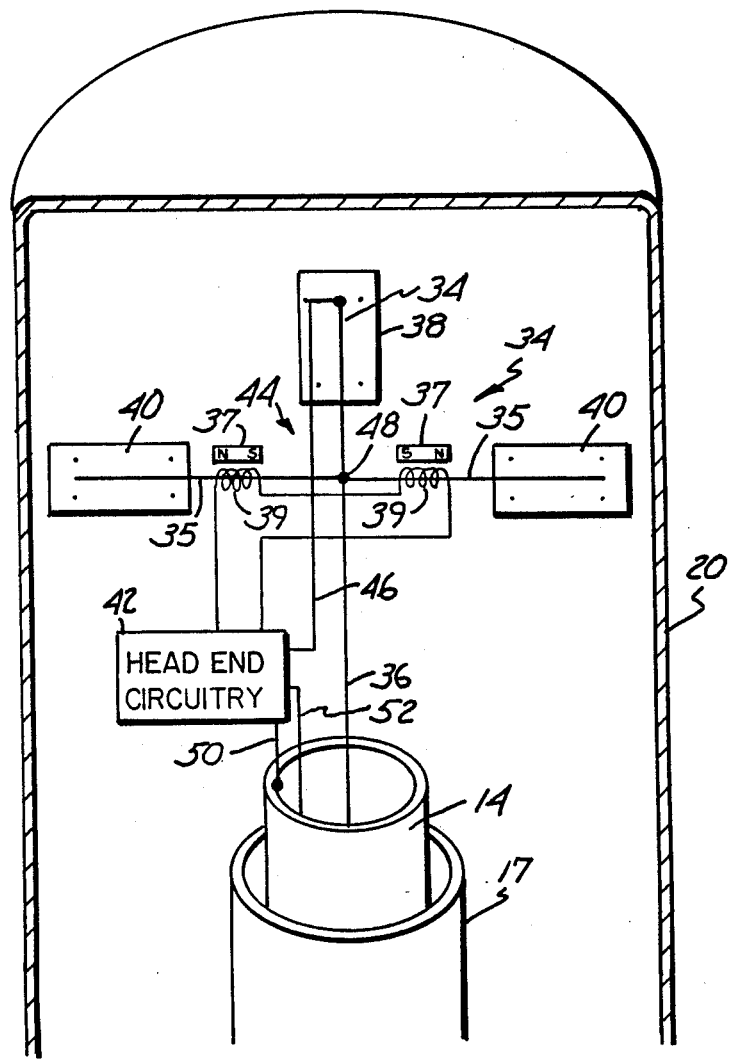
FIG. 2 is a schematic view of a headend arrangement of the sonic waveguide.

FIG. 2 illustrates headend 20 which includes headend circuitry 42 used with sonic waveguide 36. Waveguide 36 extends from within headend 20 into flexible tube 14. Headend circuitry 42 is described in the incorporated references, and will not be discussed in detail herein. Headend circuitry 42 applies current pulses onto sonic waveguide 36 via lead 46, which is connected between headend circuitry 42 and reference end 34 of the sonic waveguide. Sound wave associated with the current pulses and returning to reference end 34 of sonic waveguide 36 are damped by a damp 38, which fixes the position of sonic waveguide 36. Headend circuitry 42 is also connected to receive electrical pulses on return wire 50, which is used to complete the circuit comprising sonic waveguide 36, and signals from a temperature sensor positioned within flexible tube 14 on a temperature signal wire 52.

Headend circuitry 42 includes a transducer 44 responsive to the reception of torsional sound pulses from sonic waveguide 36. Waveguide 36 is a solid ferromagnetic, magnetostrictive, electrically conductive rod and is placed under tension, as set forth below, to act as a sonic waveguide. Tapes 35 are attached to waveguide at reference point 48, extending in opposite directions from the reference point to damping tie down strips 40. Torsional pulses on sonic waveguide 36 are converted to longitudinal pulse trains in tapes 35. Coils 39 are disposed around tapes 35. The permeability of tapes 35 varies as longitudinal pulse trains are passed by the tapes. Because there is a bias field present, induced voltages result in coils 39. These voltages are detected by headend circuitry 42. Permanent magnets 37 provide magnetic bias for coils 39.

FIGS. 3 and 4 illustrate in cross sectional views different portions of flexible tube 14 and sonic waveguide 36. In FIG. 3, a terminating end 54 for sonic waveguide 36 in flexible tube 14 is shown. Terminating end 54 includes a sealed end 56 for flexible tube 14. Spaced from sealed end 56 in flexible tube 14 is an annular indentation 58. Annular indentation 58 provides a retaining ring for a coil compression spring 60, which is used to apply tension to sonic waveguide 36. End anchor 62 is disk-sized to allow the end anchor freedom of movement longitudinally within flexible tube 14. Compression spring 60 urges end anchor 62 toward sealed end 56 of tube 14, placing sonic waveguide 36, which is connected to the end anchor, under tension. Thus, elongating tension is applied to sonic waveguide 36 through pressure applied to end anchor 62.

Sonic waveguide 36 is electrically connected to return wire 50. Return wire 50 is positioned in a buffer tube 71 and is wound into a cylindrical helix 68, which has a diameter slightly larger than that of the interior diameter of flexible tube 14. Helix 68 is drawn into flexible tube 14 and expands after installation to rest against the interior of the flexible tube. Buffer tube 71 is of soft durometer rubber, and has an interior diameter larger than the diameter of return wire 50. Flexible tube 14 is made of a resilient plastic which resists expansion by helix 68. Buffer tube 71 is positioned around return wire 50 and also is helically wound. Helix 68 presses against the interior wall of flexible tube 14 and essentially locks itself in position against the interior wall once it is positioned. Buffer tube 71 thus is spaced from the wire 50 toward the interior of helix 68 and provides a cushioned bumper for protecting sonic waveguide 36 when it touches or vibrates against the helix. Buffer tube 71 prevents the waveguide from hitting the interior of flexible tube 14.

An end damping structure 70 of rubber or another shock absorbing material is applied to sonic waveguide 36 just above end anchor 62 for dissipating sonic vibrations on the waveguide and thus preventing reflected torsional pulses from being returned to headend 20. Damping structure 70 is located centered within compression spring 60 to permit waveguide 36 to extend close to the end of flexible tube 14, and by virtue of the tube's orientation when installed in a tank, close to the bottom of the tank.

FIG. 4 illustrates a portion of flexible tube 14 and sonic waveguide 36 at a point between the headend and the terminating end. Helix 68, comprising return wire 50, extends substantially the full length of flexible tube 14. A temperature sensor 72 may be positioned within flexible tube 14, located adjacent the interior wall of the tube by partially closed mounting tube 74. Mounting tube 74 has a longitudinally opened portion and is expanded outward against the interior wall of flexible tube 14 to hold sensor 72 in a selected longitudinal position in the tube. A temperature signal cable 52 connects the resistance element of temperature sensor 72 to detecting circuitry 42 (shown in FIG. 2). Where temperature readings are required to normalize liquid volume with respect to a given temperature, a temperature responsive sensor such as a thermistor is thus fixed into position near the inner wall of flexible tube 14.

FIG. 5 is a sectional view taken along section line 5—5 of FIG. 4. Longitudinal gap 76 in mounting tube 74 allows the tube to be expanded for fixing in position sensor 72, which is mounted to the mounting tube.

Figure 6:
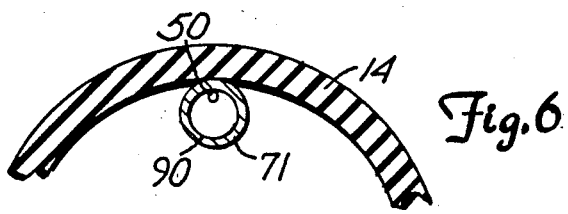
FIG. 6 is a partial sectional view of an outer containment for the sonic waveguide.

FIG. 6 illustrates the arrangement of return wire 50 within buffer tube 71. Return wire 50 is coiled into a helix of diameter greater than the interior diameter of containment 14 and accordingly moves, after introduction of the tube 71 and wire 50 combination into containment 14, toward the interior wall of the containment. The outward movement of return wire 50 compresses buffer tube 71 between the return wire and the interior wall of containment 14. Return wire 50 also has a smaller diameter than the interior diameter of buffer tube 71. As noted above, buffer tube is made of a soft durometer rubber or other flexible compound, which gives upon collisions with sonic waveguide 36, preventing direct collision between sonic waveguide 36 and the interior of flexible tube 14 or return wire 50.

FIG. 7 illustrates containment 17. Containment 17 comprises a plurality of cooperating tube segments 78, which are assembled to provide the containment. Tube segments 78 are manufactured in lengths convenient for shipping and handling. Tube segments 78 are manufactured of a relatively rigid material, selected for resistance to collapse under liquid pressures encountered at depths of 100 feet or more. Assembled tube segments 78 form containment 17 which stabilizes the position of sonic delay line assembly 10 notwithstanding movement of liquid in the storage tank. Tube segments 78 can also be constructed of a material impervious to penetration by the liquid in which a sonic waveguide is to be deployed. Containments 17 are required where depths of liquid encountered in an application would crush or collapse flexible tubes 14 or where the liquid would otherwise penetrate the material of the flexible tube. Providing for coiled shipment of flexible tube 14 and its sonic waveguide 36 limits the permissible rigidity of the tube and its consequent resistance to pressure and its strength.

Containments 17 are typically constructed on site from tube segments 78. Opposite ends of each tube segment 78 are oppositely threaded providing for a male connecting member 80 and a female connecting member 82, allowing end to end connection of the tube segments. An O-ring 84 is positioned around the base of each male connecting member 80 to aid in sealing after connection to a female member 82 is made.

Installation of a waveguide in a storage tank is done by first constructing containment 17 in the tank from a plurality of tube segments 78. A first tube segment 78 is sealed into a anchor 16 and lowered through aperture 15 in the top of a tank 12. As the assembled portions of containment 17 are lowered into position, successive tube segments 78 may be attached to the containment until anchor 16 rests on the bottom of tank 12. Then float 26 may be lowered around containment 17. A flexible tube 14 containing a sonic waveguide may be unwound from a reel into the completed containment 17. Containment 17 may then be adjusted in height and a headend 20 installed over aperture 15.

Although the present invention has been described with reference to preferred embodiments, workers skilled in the art will recognize that changes may be made in form and detail without departing from the spirit and scope if the invention.

What is claimed is:

1. A sonic delay line comprising: a headend;
   an electrically conductive, magnetostrictive rod, the rod being attached at a proximate end to the headend and anchored at a distal end to place the rod under tension, thereby providing a sonic waveguide;
   means for applying electrical pulses to proximate end of the sonic waveguide;
   a flexible tube housing the sonic waveguide;
   a return wire connected to a distal end of the sonic waveguide and to the headend to return electrical pulses applied to the sonic waveguide to the headend, the return wire being coiled in a cylindrical helix against the inside of the flexible tube to support shape of the tube;
   a carrier positionable along the outside of the flexible tube carrying a source of a static magnetic field, the static magnetic field interacting with magnetic fields associated with electrical pulse on the sonic waveguide to generate sonic pulses on the sonic waveguide; and transducer means connected to the sonic waveguide at a known point near the distal end of the sonic waveguide for converting sonic pulses on the waveguide to electrical signals.

2. The sonic delay line of claim 1 wherein the lines of flux of the static magnetic field are transverse to a portion of the sonic waveguide such that magnetic fields associated with said electrical pulses interact with the static magnetic field to generate torsional sonic pulses in the sonic waveguide.

3. The sonic delay line of claim 1 and further comprising:
the flexible tube having proximal and distal ends adjacent to the proximal and distal ends of the sonic waveguide; and
anchoring means positioned in the distal end of the flexible tube and connected to the sonic waveguide for fixing the position of the distal end of the sonic waveguide with respect to the distal end of the flexible tube.

4. The sonic delay line of claim 3 wherein the anchoring means further comprises:
a retainer positioned on the interior of the flexible tube;
a longitudinally displaceable end anchor disposed in the flexible tube, between the distal end of the tube and the retainer;
a compression spring positioned in the flexible tube between the end anchor and the retainer biasing the end anchor toward the distal end of the tube; and
a substantially inelastic connector between the sonic waveguide and the end anchor.

5. The sonic delay line of claim 4 and further comprising damping means applied to the sonic waveguide substantially longitudinally adjacent the location of the compression spring.

6. The sonic delay line of claim 3 and further comprising a rigid tubular containment for the flexible tube, the containment including:
a plurality of rigid, hollow tube sections, adapted for end to end assembly to provide for selection of a length for the containment.

7. The sonic delay line of claim 6 wherein the electrically conductive, magnetostrictive rod is solid.

8. The sonic delay line of claim 1 wherein the return wire is rubber insulated.

9. Storage tank liquid level determining apparatus comprising:
a headend positionally fixed above the maximum liquid level of the storage tank;
a flexible tube extending downwardly from the headend into the storage tank;
a sonic waveguide centered in the flexible tube formed from an electrically conductive, magnetostrictive wire connected to the headend at its proximal end and anchored in the flexible tube at its distal end;
means for applying electrical pulses near the proximal end of the sonic waveguide;
a return wire for the electrical pulses applied to the sonic waveguide connected between the distal end of the sonic waveguide and the headend, the return wire being coiled in a cylindrical helix and positioned against the inside of the flexible tube;
means for applying a static magnetic field to the sonic waveguide at a point substantially adjacent the liquid level in the storage tank, the static magnetic field interacting with magnetic fields associated with said electrical pulses to generate sonic pulses on the waveguide; and
transducer means connected to the sonic waveguide at a known point for converting sonic pulses on the waveguide to electrical signals.

10. The storage tank liquid level determining apparatus of claim 9 and further comprising:
a containment disposed around the flexible tube including a plurality of elongated hollow portions assembled end to end, the assembled containment being positioned vertically in the storage tank to orient the flexible tube and sonic waveguide and to prevent contact between the stored liquid and the flexible tube; and
the means for applying the static magnetic field comprising a float adapted to fit around the containment and to rise and fall with changes in the liquid level and a permanent magnet carried by the float.

11. The storage tank liquid level determining apparatus of claim 10 and further comprising:
liquid temperature sensing means located within the flexible tube means.

12. The storage tank liquid level determining apparatus of claim 10 wherein the containment further includes:
a plurality of cylindrical sections;
an outwardly threaded end portion to each cylindrical section;
an inwardly threaded end portion to each cylindrical section adapted to cooperate with an outwardly threaded portion; and
an O-ring fitting between the inwardly threaded end portion and the outwardly threaded end portion of two connected cylindrical sections for sealing a joint between inward and outwardly threaded portions of the two cylindrical sections.

13. The storage tank liquid level determining apparatus of claim 10 wherein the return wire is clad in a soft durometer buffer tube.

14. An apparatus including a sonic waveguide for measuring liquid levels in tanks, the device comprising:
a headend mountable on a fixed portion of the tank and containing electrical pulse transmitting and sound transducing circuitry attached to the sonic waveguide;
a flexible tube attached to the headend;
a coilable magnetostrictive rod in the flexible tube, a proximate end of the rod being attached to the headend and a distal end being anchored within the flexible tube to place the rod under tension to provide the sonic waveguide;
a return wire connected between the distal end of the magnetostrictive rod and the headend and coiled into a helix around the rod to expand against the interior of the flexible tube to support the shape of the tube; and
a rigid containment positionable outside of the flexible tube, the rigid containment being assembled from a plurality of cylindrical sections.

15. The apparatus of claim 14, and further comprising: a source of a static magnetic field; and a carrier for the magnetic field source, the carrier being positionable outside the containment.

16. The apparatus of claim 15 wherein the containment further includes:
a plurality of rigid, hollow tube sections, adapted for end to end assembly to provide for selection of a length for the containment and for on site construction of the apparatus.

17. The apparatus of claim 16 and further comprising:
the flexible tube having proximal and distal ends adjacent to the proximal and distal ends of the sonic waveguide; and
anchoring means positioned in the distal end of the flexible tube and connected to the sonic waveguide for fixing the position of the distal end of the sonic waveguide with respect to the distal end of the flexible tube and placing the waveguide under tension.

* * * * *